United States Patent [19]
Ives et al.

[11] Patent Number: 5,461,933
[45] Date of Patent: Oct. 31, 1995

[54] SHEAR WEB LOAD CELL HAVING THERMAL COMPENSATION

[75] Inventors: Kenneth D. Ives, Lebanon; John T. McClellan, Farmdale, both of Ohio

[73] Assignee: Acutus Industries, Inc., Pontiac, Mich.

[21] Appl. No.: 192,090

[22] Filed: Feb. 4, 1994

[51] Int. Cl.⁶ ........................................ G01L 2/04
[52] U.S. Cl. .................... 73/862.623; 164/150.1
[58] Field of Search ................ 73/862.623, 862.632, 73/862.635; 164/150.1, 451

[56] References Cited

U.S. PATENT DOCUMENTS

| | | | |
|---|---|---|---|
| 3,034,347 | 5/1962 | Starr | 73/862.623 |
| 3,958,456 | 5/1976 | Jacobsen | 73/862.323 |
| 4,442,884 | 4/1984 | Kunsch | 164/150.1 X |
| 4,466,477 | 8/1984 | Alofs | 164/150.1 X |
| 4,541,496 | 9/1985 | Layer | 73/862.628 X |
| 4,543,837 | 10/1985 | Stern et al. | 73/862.623 |
| 4,615,375 | 10/1986 | Bower et al. | 164/150.1 X |
| 5,129,266 | 7/1992 | Brandt, Jr. | 73/862.623 |
| 5,349,871 | 9/1994 | Naganuma | 73/862.635 |

OTHER PUBLICATIONS

Electronics Engineers' Handbook, Third Edition, pp. 10–13 and 10–14.

Primary Examiner—Richard Chilcot
Assistant Examiner—Elizabeth L. Dougherty
Attorney, Agent, or Firm—Dykema Gossett

[57] ABSTRACT

A stainless steel load cell having a shear web design suitable for use in a continuous casting environment is disclosed. Strain gauges are disposed on both sides of each of the four webs to detect deformation, while a wheatstone bridge is provided, having thermally-compensated potentiometers, to balance the strain gauge output to provide a signal indicative of an applied load. The interior of the load cell is sealed on both sides with disc shaped stainless steel seal members. The interior of the load cell is coated with a very low durometer polymer to provide the bridge and strain gauges with a barrier to moisture and other corrosive vapors. The load cell is enclosed by an air-tight canister that is supplied with pressurized nitrogen gas for drying purposes.

17 Claims, 3 Drawing Sheets

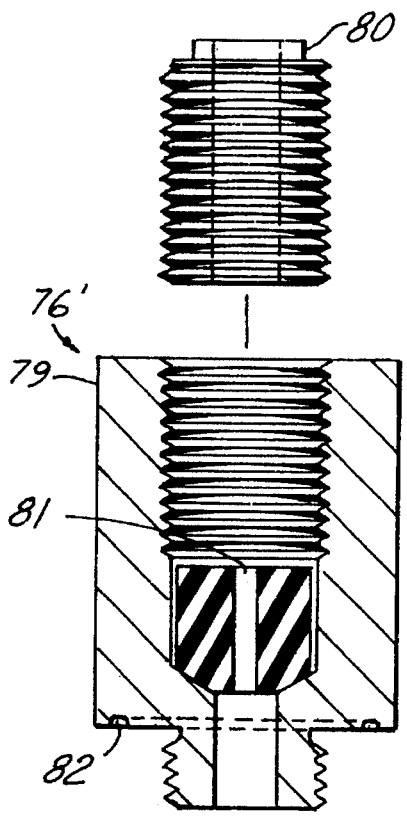
FIG. 8
FIG. 7
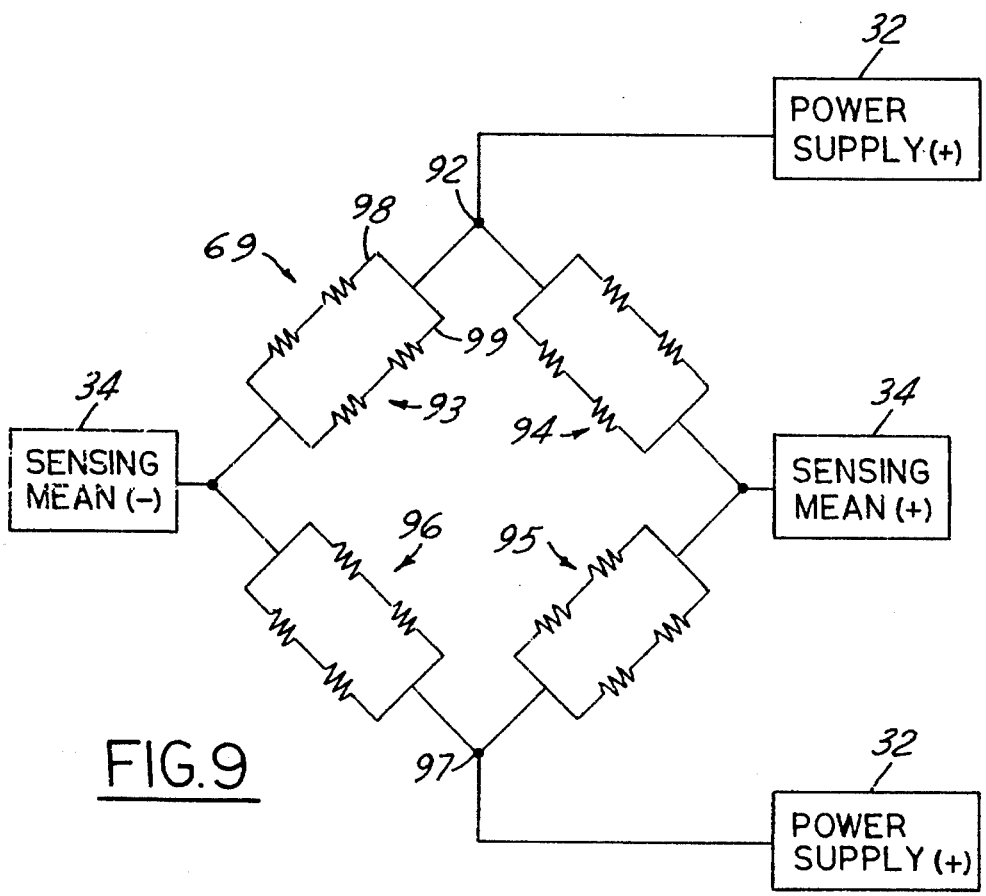
FIG. 9

SHEAR WEB LOAD CELL HAVING THERMAL COMPENSATION

TECHNICAL FIELD

This invention relates generally to a shear web load cell device, and more particularly a shear web load cell having thermal compensation for use in continuous casting operations and the like.

BACKGROUND OF THE INVENTION

Prior art force transducers, particularly load cells, range widely in their basic design depending upon such factors as the mechanical placement of the load cell in the subject application, the sensitivity required, and the environment in which the load cell is used. In continuous casting operations where a mold is used to form a cast product, the mold walls are typically moved relative to other mold walls through use of a clamping bolt driven by screw jacks to form products of various dimensions. The force supplied by the clamping bolt has been found to be a critical parameter in these operations. Thus, load cells are frequently used to detect and control the force exerted by the clamping bolt during casting operations.

A typical load cell application involves passing the clamping bolt through the load cell wherein the load cell is intermediate the force application means—the clamping bolt—and the object desired to be moved—the mold wall; thus, a through hole load cell is required. The prior art through hole load cells used in continuous casting applications are of the tubular or column element type where the force applied by the clamping bolt is transferred axially through the column to the mold wall, thus placing the column in compression and creating a strain that is sensed by a plurality of biaxial strain gauges mounted around the surface of the column. This design has proven unsatisfactory because accurate force measurements for column type load cells depend on a true parallel application of the force to the column element. If the force or load applied to the column is not on-axis, the column will be subjected to a bending load; i.e., the component of the applied force that is off-axis. This bending load creates a strain that will be detected by one of the biaxial strain gauges and will introduce an error in the load cell force measurement output. Moreover, prior art load cell systems have proven unsatisfactory in the continuous casting environment because of temperature nonlinearity in the load cell output caused by the wide temperature changes associated with the casting process. Further, the casting environment is extremely corrosive, thus causing an unacceptably high failure rate among prior art load cells due to inappropriate materials selection and inadequate sealing subsystem design.

Thus, there is a need for an improved load cell for generating a signal indicative of the force transmitted through the load cell that overcomes or minimizes the above-mentioned problems.

SUMMARY OF THE INVENTION

Use of a load cell geometry that distributes bending loads due to off-axis loading results in a more even application of the applied force and greater accuracy in detecting the magnitude of that applied force. Accordingly, in one aspect of this invention, a load cell for detecting a force transmitted through the load cell is disclosed wherein a sensing element for converting the force into a mechanical deformation has an inner cylinder for being acted upon by the force, and a plurality of shear webs extending from and circumferentially spaced about the inner cylinder for transferring the applied force to an outer support means. The load cell is further provided with transduction means mounted on the plurality of shear webs for converting the mechanical deformation into at least one signal indicative of the deformation, and means responsive to the deformation indicative signal for determining the value of the applied force and generating a force indicative signal.

In another aspect of the present invention, temperature related error introduced into the force indicative signal due to temperature variations associated with continuous casting operations has been minimized by including in the above-mentioned determining means thermally-compensated potentiometers for adjusting the determining means and to compensate for the temperature related error in the force indicative signal.

In a still further aspect of the present invention, the load cell is provided with a sealing means mounted to the sensing element and positioned relative to the sensing element to enclose the transduction means for providing resistance to liquid water, steam, and other corrosive vapors. The sealing means and the sensing element are fabricated from stainless steel to resist corrosion. Further, the transduction means and the determining means are coated by a relatively low durometer polymer for providing resistance to moisture and other corrosive vapors associated with the casting process. The above claimed aspects of an advanced sealing system and stainless steel construction provide a load cell that is extremely resistant to the corrosive, high temperature casting environment to thereby reduce casting operation downtime due to load cell failure.

Other objects, features and advantages will become clear or will be made apparent during the course of the following description of a preferred embodiment of the present invention.

BRIEF DESCRIPTION OF THE DRAWINGS

FIG. 7 is an elevation view of a body portion of a wire seal used in the load cell of FIG. 4;

FIG. 8 is an elevation view of plug means for use in conjunction with the wire seal body shown in FIG. 7;

FIG. 9 is a partial schematic of a means for determining the force applied to the load cell of FIG. 4.

DETAILED DESCRIPTION OF THE INVENTION

Figure 1:
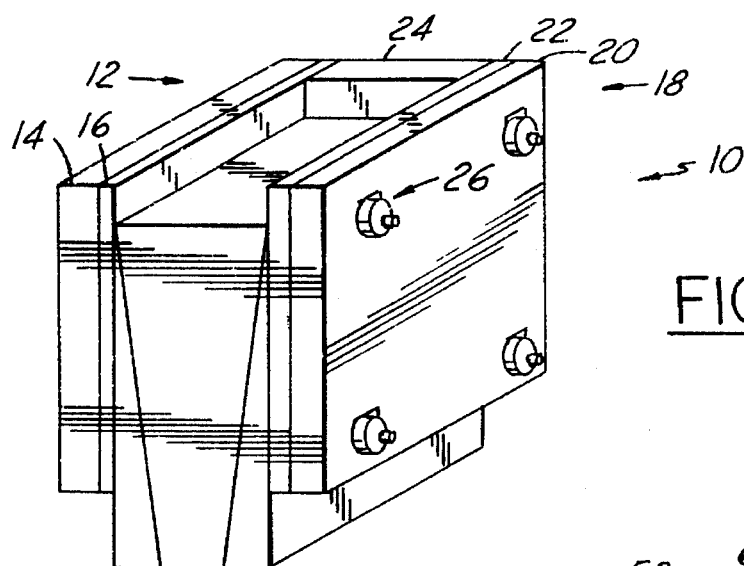
FIG. 1 is a perspective diagrammatic view of a continuous casting mold depicting the use of a load cell made in accordance with the present invention.

Referring now to the drawings wherein like reference numerals are used to refer to identical components in the various views, FIG. 1 depicts a casting mold 10 as used in continuous casting operations, an environment in which the load cell of the present invention may be advantageously employed. The mold 10 includes a first broadface 12 having a steel portion 14 and a copper portion 16, and a second broadface 18 having a steel portion 20 and a copper portion 22. The mold 10 further includes a movable end wall 24, along with a second moveable end wall on the opposite side of mold 10 not shown for clarity, and a plurality of load cell assemblies 26. The mold 10 has a cavity defined by first and second broadfaces 12 and 18, and the two end walls 24. In a typical installation, first broadface 12 is fixed and second broadface 18 is adjustable. In the most efficient prior art continuous casting molds, the width of the cavity is varied during the casting process to produce a cast product, typically steel, suitable to meet predetermined product specifications. The width of the cast product is varied by a procedure wherein the end walls 24 of the mold are moved so that the cavity width matches the predetermined product width dimension. There exists, however, several factors that make moving the walls a fairly complex operation. During normal casting operations, the mold broadfaces 12 and 18 are pressed against end walls 24 to ensure that no metal encroaches into the gap between the corner of end walls 24 and a respective copper portion 16 and 22. Sufficient force must be applied to withstand the ferrostatic forces exerted by the product in the mold against the broadfaces 12 and 18; however, the applied force also must not be so great as to cause the end walls 24 to imprint the relatively soft copper portions 16 and 22 of broadfaces 12 and 18. Thus, during casting, the applied force is critical to successful operations. Moreover, during the above-mentioned movement of end walls 24, the clamping force applied to the broadfaces 12 and 18 to hold end walls 24 is typically reduced or controlled in order to minimize the possibility of scratching copper portions 16 and 22, since, during casting operations, the copper portions 16 and 22 experience a respective thermal expansion, which, if uncorrected, increases the force of the two broadfaces against the end wall 24. Thus, during adjustment operations, the applied force is also critical to satisfactory operations. It should be appreciated by those or ordinary skill in the art that an accurate and reliable determination of the clamping force is critical for reliable production of the cast product.

Thus, mold 10 is provided with a plurality of load cells made in accordance with the present invention to monitor the clamping force. Further, the detected clamping force may be used to control the applied force during casting events. As shown in FIG. 1, four load cell assemblies 26, diagrammatically shown, may be used, one each at the four corners of second broadface 18; however, additional load cell assemblies 26 may be added as required by various casting system designs.

Figure 2:
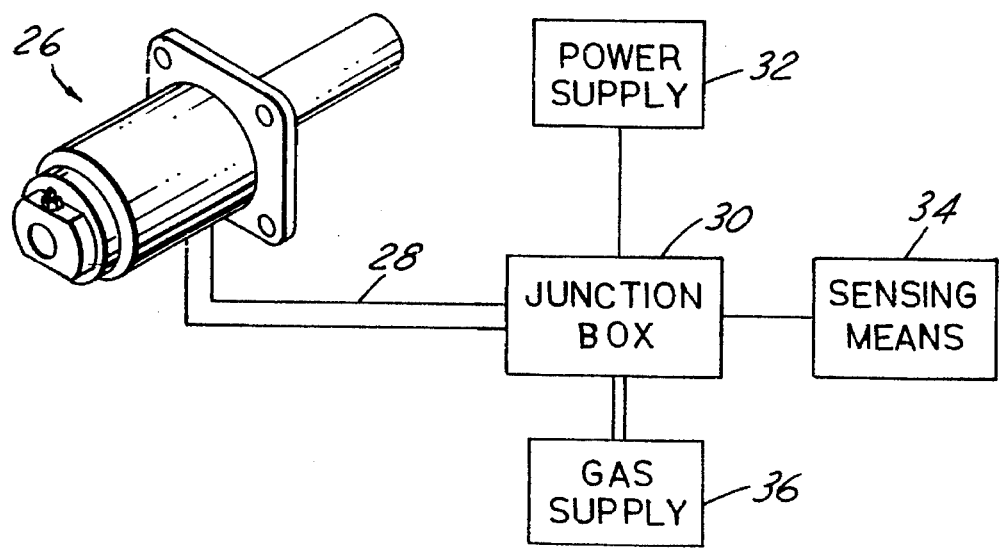
FIG. 2 is a perspective view of a load cell assembly that includes the load cell of FIG. 1 shown in connection with a block diagram depicting several functional subsystems of an inventive system for detecting a force.

Referring to FIG. 2, the purpose of load cell assembly 26 is to provide a structure through which an applied force can be effectively transferred to the mold broadface and in which the load cell may be disposed to generate an output signal indicative of the applied force. To facilitate transfer of the force indicative signal, the assembly 26 is connected by flexible conduit 28 to a junction box 30, box 30 being coupled with a power supply 32 and a sensing means 34. The power supply 32 provides an excitation voltage or current to load cell assembly 26 via junction box 30 and conduit 28 so that when a load is applied to load cell assembly 26, a force indicative signal is produced using the excitation voltage or current. The force indicative signal is then carried through conduit 28 and junction box 30 to sensing means 34. Sensing means 34 may be operative to indicate to an operator the applied force, who may then take appropriate action, or may be further connected to a control system (not shown) that is effective to vary the clamping force in response to the force indicative signal in accordance with a preselected program. A gas supply 36 is in communication with load assembly 26 through junction box 30 and flexible conduit 28 and is effective to supply pressurized, relatively inert gas to the load cell assembly 26. Preferably, the gas is nitrogen gas supplied at a pressure of four pounds per square inch. Circulation of the nitrogen gas aids in removing moisture (i.e., drying effect) from the interior of load cell assembly 26, and, in addition, also helps to stabilize temperature changes within the load cell assembly.

Figure 3:
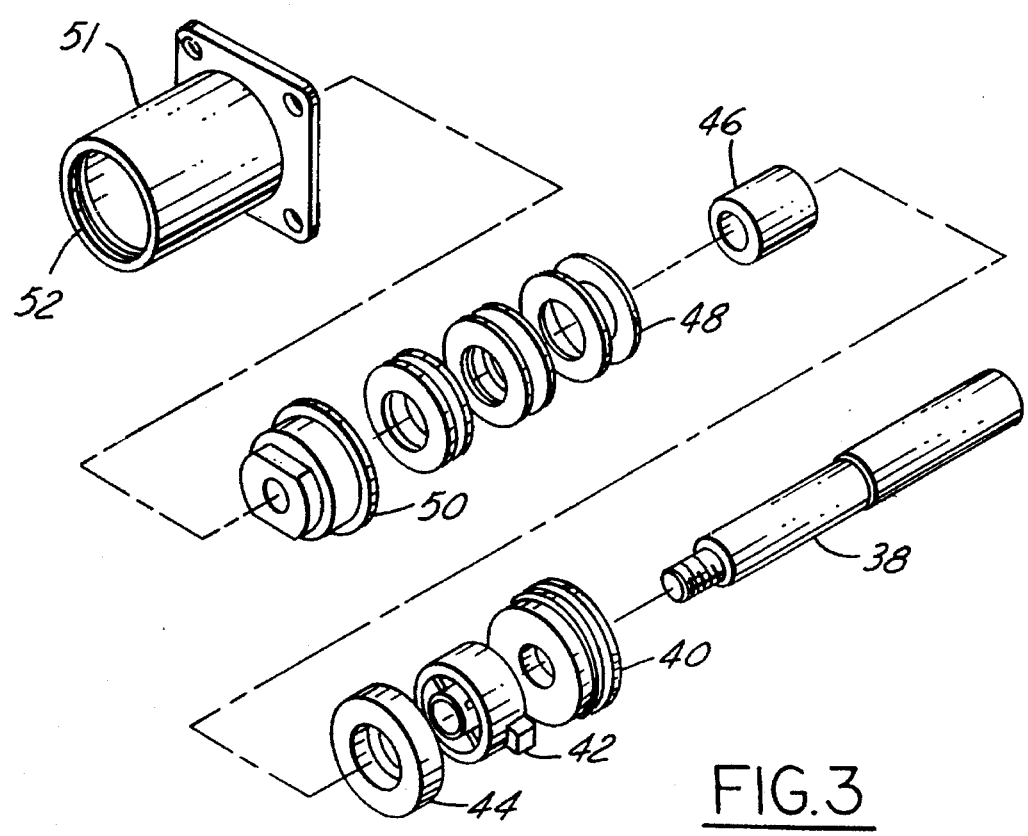
FIG. 3 is an exploded perspective view of the load cell assembly shown in FIG. 2.

As shown in FIG. 3, load cell assembly 26 is comprised of a clamp shaft 38, a first load washer 40, a load cell 42, a second load washer 44, a spring centering sleeve 46, spring means 48, which may take the form of a spring pack including a plurality of belleville springs wherein adjacent springs are in reverse orientation, retaining means 50, which may take the form of a clamp shaft nut 50, and housing means, which may take the form of canister 51, which includes a lip portion 52.

The clamp shaft 38 is coupled to a force application means (not shown) for applying a force, via shaft 38, to load cell assembly 26, which is effective to move, for example, the broadface 18 of mold 10, as shown in FIG. 1. As shown in FIG. 2, the subassembly of shaft 38, washer 40, load cell 42, washer 44, sleeve 46, spring 48, nut 50 is slidably received within canister 51. The first load washer 40 is provided with an O-ring seal mounted thereon. Moreover, canister 51 is also provided with an O-ring seal disposed in a groove in lip portion 52. The two above-mentioned O-ring seals provide a relatively air-tight seal around load cell 42. Because of these seals, gas supply 36 may then supply pressurized nitrogen gas, as described above, through flexible conduit 28 into canister 51 in the general area of load cell 42 with negligible loss of gas pressure.

In a typical continuous casting mold, such as mold 10 shown in FIG. 1, load washer 40 bears against steel portion 20 of second broadface 18. When shaft 38 is moved axially inwardly toward first broadface 12, the retained nut 50, which is fixed to shaft 38, is also drawn toward first broadface 12. The nut 50 engages spring 48, which in turn engages load washer 44, which in turns engages load cell 42, which in turns bears against load washer 44, which bears against steel portion 20 of second broadface 18. In this manner, the load cell 42 is stressed, which provides a deformation that forms the basis for determining the magnitude of the applied load.

Figure 4:
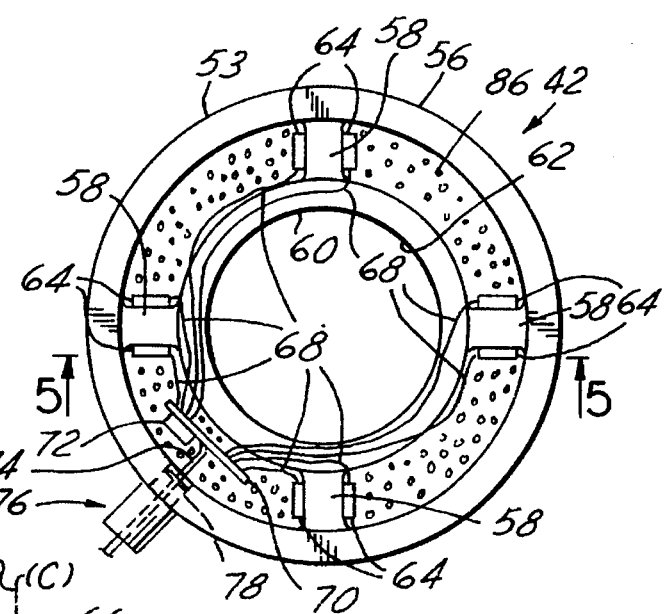
FIG. 4 is a plan view of a sensing element of the load cell shown in FIG. 3 including a plurality of shear webs and transduction means.
Figure 5:
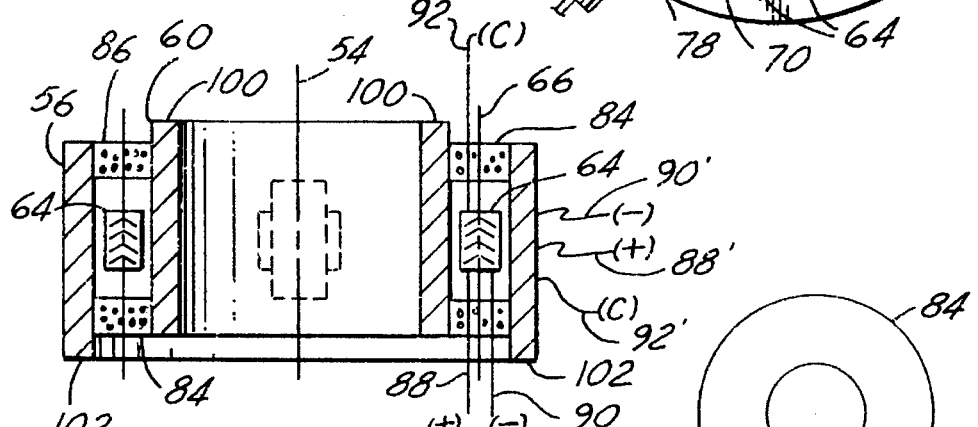
FIG. 5 is a partial section view taken along line 5—5 of FIG. 4 showing a plurality of strain gauges mounted to detect shear in the plurality of shear webs.

Referring now to FIG. 4, load cell 42 comprises a sensing element 53, which is adapted for controlled deformation under loads, and which forms one basic functional part of load cell 42. Preferably sensing element 53 is constructed of 17-4 pH stainless steel. As shown in FIG. 5, sensing element 53 is elongated and has a longitudinal axis 54.

As best shown in FIG. 4, sensing element 53 is provided with a support means, for transferring an applied load to load washer 40 and preferably takes the form of an outer ring support 56. Extending from outer ring support 56 are a plurality of force transfer elements, which may take the form of shear webs 58, which are connected to a force application portion, preferably inner cylindrical body 60. Preferably, sensing element 53 is provided with four of the webs 58, although, for other load handling capacities and cost parameters, other numbers of webs 58 may be selected. The thickness of the webs 58 may also be varied without changing the number of the webs. For example, the load cell 42 preferably handles 25,000 pound loads; however, by increasing the thickness of webs 58, other embodiments with load handling capacities of 35,000 and 50,000 pounds, respectively, have been made. Formed through body 60 is a centrally-disposed bore 62 for receiving shaft 38. The bore 62 is sized relative to shaft 38 to provide a close tolerance fit. Thus, sensing element 53 provides a structure, which includes outer support ring 56, the plurality of shear webs 58, and inner cylindrical body 60, that may be acted upon by a force and which is adapted to transfer the force while mechanically deforming in accordance with that force.

In addition to an element designed for controlled deformation under loads, it is well known in the art to provide transduction means in a load cell to convert the mechanical deformation into a signal indicative of the deformation. Accordingly, a second basic functional part of load cell 42 includes a transduction means comprising a plurality of basal shear strain gauges 64, which are well known and commercially available; e.g., model J2A-06-S036R-350 strain gauges available from the Measurements Group of Raleigh, N.C. As shown in FIG. 5, the gauges 64 are disposed on webs 58 about an axis 66 of web 58 and, preferably, the individual grid elements of each gauge 64 are aligned at 45 degrees from axis 66, the angle being selected to measure the shear in the plurality of webs 58. It should be appreciated that, as shown in FIG. 5, there are two segments associated with gauge 64, and although both are aligned at about 45 degrees with respect to axis 66, the orientation of one of the segment is opposite that of the other. This biaxial characteristic of gauge 64 allows compression to be measured in one segment and tension to be measure in the other segment for purposes of improved force measurement. Further, as shown in FIG. 4, one gauge 64 is mounted on both sides of each web 58. This configuration allows the detection of off-axis loading in a manner superior to those systems found in the prior art. For example, if one side of web 58 is in compression while the other side is in tension, then the respective deformations can be summed or otherwise processed to obtain an accurate measure of loading. It should be understood that when the plurality of shear webs 58 are stressed by displacement of outer ring support 56 relative to inner cylinder body 60, each web 58 will experience a respective deformation resulting from placement of the web in compression or tension. Each strain gauge 64 converts the respective deformation into a deformation indicative signal, as is well known in the art.

Each of the shear strain gauges 64 is connected by a respective gauge lead 68 (shown as a single lead for purposes of clarity only) to a means for determining the value of the applied force and for generating a force indicative signal that is indicative of the value of the applied force, and which may take the form of a wheatstone bridge 69, as shown in FIG. 9. A termination board 70 is provided as a means for connecting the leads 68 is an appropriate fashion to form bridge 69. It should be appreciated that the resistive components of bridge 69 primarily comprise the strain gauges 64. The board 70 includes at least one thermally compensated potentiometer 72 for initially establishing a precision balance for the wheatstone bridge 69 and to set a precise scale factor for full scale applied load, which may, for example, be set to 2 millivolts/volts. Thus, for example, an excitation voltage of 10 volts supplied from power supply 32 will provide a wheatstone bridge that will generate a 20 millivolt signal at full load. The potentiometers 72 are commercially available; e.g., part number 1285 G, 20K or 100R, 5% from Vishay of Malvern, Pa. The board 70 may also contain precision resistors, such as a 10 kiloOhm, 0.01% tolerance, part number S102K from Texas Components of Houston, Tex. Thermally compensated potentiometer 72, as used in the inventive load cell 42, solves a problem in the art whereby force indicative signals output from prior art load cells varied significantly primarily as a function of the ambient temperature. This problem is especially significant in the continuous casting environment where load cell temperatures vary from approximately room temperature (75 degrees Fahrenheit) to nearly 200 degrees Fahrenheit. Use of the potentiometers 72 allow for accurate force indications since the potentiometers 72 are relatively immune to temperature changes over a predetermined range.

The board 70 generates a signal indicative of the force applied to load cell 42; this signal is coupled to sensing means 34 (FIG. 2) through conductor cable 74, which exits load cell 42 through a wire seal 76 fixedly disposed in an opening 78 formed through outer ring support 56. In addition, conductor cable 74 also carries the above-mentioned excitation voltage or from power supply 32 to board 70. Cable 74 is mechanically routed through flexible conduit 28 to reach junction box 30.

The wire seal 76 provides a tight seal against the entry of corrosive vapors through which cable 74, and thus the force indicative signal, may be routed or fed. The wire seal 76 may take a form that is known in the art and is commercially available, for example a Viton wire seal model RS-PG4-312-V from Conax Buffalo (Patrick and Douglas) of Lombard, Ill. Both wire seal 76 and opening 78 are threaded so that wire seal 76 can be removed from load cell 42 for providing access to gauge leads 68, board 70, potentiometers 72, and conductor cable 74.

Preferably, however, cable 74 accesses load cell 42 through wire seal 76', shown in FIG. 7. Wire seal 76' includes a body portion 79, a chase plug portion 80, shown in FIG. 8, and a compressible grommet 81. Body 79 is threaded on a longitudinally lower portion such that body 79 can be removably mounted in opening 78 of sensing element 53. Further, body 79 has a longitudinally-extending bore; the upper longitudinal portion of the bore being enlarged relative to the lower longitudinal portion and also threaded. The plug 80 is also externally threaded over substantially all its length, and is adapted to be removably mounted in the threaded bore portion of body 79. Plug 80 also includes a centrally-disposed longitudinally-extending bore sized to allow cable 74 to pass therethrough. Grommet 81 is adapted to be received within the enlarged bore portion of body 79 and includes a centrally-disposed longitudinally-extending bore, the bore being sized, in its uncompressed state, to allow cable 74 to pass therethrough. Body 79 is also provided with a O-ring seal groove 82, adapted to received O-ring seal (not shown).

To utilize wire seal 76' in load cell 42, body 79, with an O-ring seal disposed in groove 82, is screwed into threaded opening 78 until a tight fit is achieved. The O-ring seal prevents moisture and other corrosive vapors from entering the load cell via opening 78. Cable 74 is brought out of the load cell 42 through the bore in body 79, the bore in grommet 82, which is disposed in body 79, and the bore in plug 80. The plug 80 is screwed into body 79; as grommet 81 is compressed, the central bore of grommet 81 collapses around the outside diameter of cable 74, thus providing a vapor tight seal. Body 79 and plug 80 are both 17-4 pH stainless steel to provide corrosion resistance.

Figure 6:
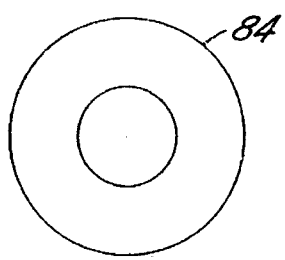
FIG. 6 is a plan view, not to scale, of a seal member portion of the load cell shown in section in FIG. 4.

The load cell 42 also includes sealing means mounted to sensing element 53 and positioned relative to sensing element 53 to enclose strain gauges 64, gauge leads 68, board 70, potentiometer 72, and a portion of cable 74. Preferably, the sealing means takes the form of a pair of press fit seal members 84, as shown in FIG. 5 and 6. The seal members 84 are preferably fabricated out of 17-4 pH stainless steel (42–44 Rc), so that they are themselves resistant to corrosion. The pair of seal members are press fit into the cavity of sensing element 53, shown in FIG. 5, and are seal welded, thus providing a barrier to corrosive vapors, such as steam, fluorine-based corrosive compounds carried by the steam, and other vapors resulting from the casting process. The relatively small thickness, preferably 1/16th inch, provides a flexible membrane that does not structurally affect the controlled deformation of sensing element 53 under loads.

It should be understood that the seal member depicted in FIG. 6, although accurately representing the general structure of the seal member 84, is fabricated in two sizes; the larger seal member is mounted on the top of sensing element 53, as shown in FIG. 5, while the dimensionally smaller seal member is mounted to the bottom of sensing element 53, again as shown in FIG. 5.

As part of the inventive advance in sealing technology associated with the load cell of the present invention, load cell 42 is filled through opening 78, after the pair of seal members 84 have been installed, with a relatively low durometer polymer gel 86 (see FIGS. 4 and 5) to coat the instrumentation internal to the load cell 42; the instrumentation comprising the strain gauges 64, the gauge leads 68, the board 70, the potentiometer 72, and cable 74. After the gel 86 is allowed to set, the gel 86 is poured out of load cell 42 through opening 86, thus leaving a coating on the instrumentation. The gel 86 preferably is Gella 444I encapsulating compound from 3M, available from Englewood Electric of East Chicago, Ind. Moreover, gel 86 has been found to have negligible structural impacts on the accurate functioning of strain gauges 64, and provides to the above-named instrumentation a barrier that is resistant to liquid and vapor water and other corrosive vapors associated with the casting process, such as, for example, fluorine-based vapors and the like deriving from various mold powders that are typically carried by the steam.

Referring to FIG. 4, it is shown that the termination board 70, and particularly the thermally-compensated potentiometer 72, are disposed in a cavity formed by adjacent webs 58 that is accessible through opening 78. This relative orientation of the potentiometer 72 and the opening 78 provides a means for repairing defective components of board 70, or replacing defective cable 74 or leads 68, or recalibrating, via potentiometer 72, as necessary.

Referring to FIGS. 4, 5, and 9, and particularly FIG. 5, each strain gauge is preferably a three-terminal device; a positive lead 88, a negative lead 90, and a common lead 92. Since each web preferably includes one strain gauge mounted on each side, the leads of a second strain gauge for the web 58 in the three o'clock position as shown in FIG. 4 are shown is FIG. 5, and are shown as positive lead 88', negative lead 90', and common lead 92'. Preferably, sensing element 53 includes four webs 58. As shown in FIG. 9, wheatstone bridge 69 includes a positive first and second web network 93, a negative first and second web network 94, a positive third and fourth web network 95, and a negative third and fourth web network 96. The webs 58 are numbered in sequential order; thus, any two adjacent webs 58 will be either the first and second webs, the second and third webs, etc., depending on which web is chosen as the first web 58. Thus, opposite webs will be either first and third, or, second and fourth webs. It should be appreciated that opposite networks 93, 94, 95, 96, as shown in FIG. 9, also represent correspondingly opposite webs 58. In this way, off-axis loads can be detected in a fashion superior to that shown in the prior art.

To further elaborate, leg 98 of network 93 depicts two resistances in series; these two resistances represent the corresponding segments in the two gauges 64 mounted on the first web 58. Similarly, the two resistances in leg 99 represent the corresponding segments in the two gauges 64 mounted on the second web 58, which is a web 58 adjacent the first web 58.

For example, an off-axis load will cause opposite webs to be in tension and compression, respectively. If a first web 58 is in tension, then a third web 58 will be in compression (when a bending load is applied); the resistance of network 93 will increase because the resistance value of branch 98 will increase (because in tension), while the resistance of network 96 will decrease because one of its branches (the branch corresponding to the third web 58) will decrease (because in compression). Since networks 93 and 96 form a voltage divider of the excitation voltage, the voltage, relative to node 97, at the node connected to sensing means 34 (−), will increase, thus providing information indicating off-axis loading.

The potentiometer 72 (not shown in FIG. 9) may be used in any conventional manner for purposes of balancing and scaling bridge 69.

The operation of load cell 42 will now be described. Referring now to FIGS. 1, 3 and 5, shaft 38 is displaced longitudinally by a force application means (not shown) relatively inwardly toward first broadface 12. The force exerted by shaft 38 is coupled to load washer 44 which bears against first surface 100 of load cell 42, as best shown in FIG. 5. A second surface 102 of load cell 42, bears against load washer 40, which in turn bears against steel portion 20 of second broadface wall 18. The inner cylinder body 60 is displaced relative to outer ring support 56, which stresses the plurality of shear webs 58 that structurally connect body 60 to ring support 54. The shearing forces that act upon the plurality of shear webs 58 cause each of the webs 58 to deform. This deformation causes a corresponding change in each of the plurality of shear strain gauges 64, and, as is well known in the art, each strain gauge generates a deformation indicative signal. Each of the deformation signals is fed to board 70 via a respective lead 68. The excitation voltage from power supply 32 having already been established prior to application of the force by shaft 38, a signal indicative of the applied force is generated from board 70 using the plurality of deformation indicative signals and is fed through cable 74, which is carried in conduit 28, to sensing means 34 where the signal may be used to control the applied force to a mold broadface.

It is to be understood that the above description is merely exemplary rather than limiting in nature, the invention being limited only by the appended claims. Various modifications and changes may be made thereto by one of ordinary skill in the art which will embody the principals of the invention and fall within the spirit and scope thereof.

What is claimed is:

1. A system for detecting a force applied by a force application means to a wall of a casting mold, comprising:

a sensing element mounted intermediate said wall and said force application means for converting said force into a deformation;

transduction means mounted on said sensing element so as to leave a portion of said transduction means exposed for converting said deformation into a signal indicative of said deformation, said exposed portion of said transduction means being coated by a relatively low durometer polymer for providing a barrier to corrosive vapors.

2. The system of claim 1 wherein said sensing element is constructed of stainless steel.

3. The system of claim 1 further comprising:

means responsive to said deformation indicative signal for determining the value of said force and generating a force indicative signal, said determining means including thermally-compensated potentiometers for adjusting said determining means and for providing a substantially linear output over a predetermined temperature range.

4. The system of claim 3 further comprising:

sealing means mounted to said sensing element and positioned relative to said sensing element to enclose said transduction means for providing a barrier to corrosive vapor.

5. The system of claim 4 wherein said sensing element includes an inner cylinder coupled to said force application means, a plurality of webs extending from and circumferentially spaced about said inner cylinder, and an outer support means connected to said plurality of webs and coupled to said wall, wherein said force applied by said force application means is transferred from said inner cylinder to said support means through said plurality of webs and each of said webs experiences a respective deformation and wherein said sensing element is constructed of stainless steel.

6. The system of claim 5 wherein said transduction means includes a plurality of strain gauges mounted to said plurality of webs, each of said gauges generating a respective deformation indicative signal in response to said deformation.

7. The system of claim 6 wherein at least one of said plurality of gauges are mounted to each of said plurality of webs.

8. The system of claim 7 wherein one of said plurality of gauges is mounted on each side of a respective web.

9. The system of claim 3 wherein said sensing element includes a wire seal mounted thereon for allowing said force indicative signal from said determining means to be routed therethrough and for providing a seal to substantially reduce the entry of corrosive vapor into said sensing element.

10. The system of claim 9 wherein said wire seal is removably mounted to said sensing element.

11. A system for detecting a force applied by a force application means to a wall of a casting mold, comprising:

a sensing element mounted intermediate said wall and said force application means for converting said force into a deformation;

transduction means mounted on said sensing element for converting said deformation into a signal indicative of said deformation, said transduction means being coated by a relatively low durometer polymer for providing a barrier to corrosive vapors;

means responsive to said deformation indicative signal for determining the value of said force and generating a force indicative signal, said determining means including thermally-compensated potentiometers for adjusting said determining means and for providing a substantially linear output over a predetermined temperature range; and, housing means for housing said sensing element, said housing means having conduit means attached thereto for carrying said force indicative signal, an interior portion of said housing means containing said sensing element being pressurized with gas through said conduit means for drying said interior and for stabilizing the temperature in said interior.

12. The system of claim 11 wherein said pressurized gas is nitrogen.

13. A load cell for detecting a force applied to the load cell, comprising:

a sensing element having an inner cylinder for being acted upon by said force, an outer support means, and a plurality of shear webs extending from and circumferentially spaced about said inner cylinder and connected to said support means, said webs transferring said force from said inner cylinder to said support means wherein said webs experience a respective deformation when stressed by said force;

transduction means mounted on said plurality of shear webs for converting said deformations into at least one signal indicative of said deformations;

means responsive to said deformation indicative signal for determining the value of said force and for generating a force indicative signal, said determining means including thermally-compensated potentiometers for adjusting said determining means and to compensate for variations in said force indicative signal due to ambient temperature variations; and, sealing means mounted to said sensing element and positioned relative to said sensing element to enclose said transduction means for providing a barrier to corrosive vapor, said sensing element further including a wire seal mounted thereon for allowing said force indicative signal from said determining means to be routed therethrough and for providing a seal to substantially reduce the entry of corrosive vapor into said sensing element, and wherein said transduction means and said determining means are coated by a relatively low durometer polymer for providing a barrier to corrosive vapor;

wherein said thermally-compensated potentiometers are removably included in said determining means and said wire seal is removably mounted on said sensing element for providing access to said transduction means and said determining means.

14. The load cell of claim 13 wherein said sensing element and said sealing means are stainless steel and said transduction means includes a plurality of strain gauges mounted to said plurality of shear webs.

15. A load cell for detecting a force transmitted through the load cell for use in casting operations, comprising:

a sensing element having an inner cylinder for being acted upon by said force, a plurality of shear webs extending from and circumferentially spaced about said inner cylinder, and an outer support means connected to said plurality of webs for transmitting therefrom said force transferred to said support means through said plurality of webs, wherein said webs experience a respective deformation when stressed by said force;

transduction means mounted on said plurality of shear webs for converting said deformations into at least one signal indicative of said deformations;

sealing means mounted to said sensing element and positioned relative to said sensing element to enclose said transduction means for providing a barrier to corrosive vapor, and wherein said transduction means is coated by a relatively low durometer polymer for providing a barrier to corrosive vapor; and, means responsive to said deformation indicative signal for determining the value of said force and for generating a force indicative signal, said determining means including thermally-compensated potentiometers for adjusting said determining means and to compensate for variations in said force indicative signal due to ambient temperature variations, said sensing element further including a wire seal mounted thereon for allowing said force indicative signal from said determining means to be routed therethrough and for providing a seal to substantially reduce the entry of corrosive vapor into said sensing element, and wherein said determining means is coated by a relatively low durometer polymer for providing a barrier to corrosive vapor, wherein said thermally-compensated potentiometers are removably included in said determining means for replacement and said wire seal is removably mounted on said sensing element for providing access to said transduction means and said determining means, and wherein said sensing element and said sealing means are stainless steel and said transduction means includes a plurality of strain gauges mounted to said plurality of shear webs.

16. The load cell of claim 15 wherein said wire seal comprises a body portion having a first longitudinally-extending bore, a grommet disposed within said first bore, said grommet having a second longitudinally-extending bore, said wire seal further including plug means adapted to be received within said first bore for compressing said grommet wherein said second bore is collapsed to seal the interior of said sensing element from corrosive vapor.

17. A system for detecting a force applied by a force application means to a wall of a casting mold, comprising:

a sensing element mounted intermediate said wall and said force application means for converting said force into a deformation;

transduction means mounted on said sensing element for converting said deformation into a signal indicative of said deformation;

means responsive to said deformation indicative signal for determining the value of said force and generating a force indicative signal; and, housing means for housing said sensing element, said housing means having conduit means attached thereto for carrying said force indicative signal, an interior portion of said housing means containing said sensing element being pressurized with gas through said conduit means for drying said interior and for stabilizing the temperature in said interior.

* * * * *